United States Patent
Rockett (10) Patent No.: US 12,269,772 B2
(45) Date of Patent: Apr. 8, 2025

(54) POLISHED LIGHTWEIGHT STRUCTURAL CONCRETE AND METHOD OF FORMATION

(71) Applicant: Bart Rockett, Marlton, NJ (US)

(72) Inventor: Bart Rockett, Marlton, NJ (US)

(*) Notice: Subject to any disclaimer, the term of this patent is extended or adjusted under 35 U.S.C. 154(b) by 518 days.

(21) Appl. No.: 17/683,723

(22) Filed: Mar. 1, 2022

(65) Prior Publication Data

US 2022/0289628 A1 Sep. 15, 2022

Related U.S. Application Data (60) Provisional application No. 63/158,591, filed on Mar. 9, 2021.

(51) Int. Cl.
*C04B 18/02* (2006.01)
*B28B 11/08* (2006.01)
(Continued)

(52) U.S. Cl.
CPC ........ *C04B 18/027* (2013.01); *B28B 11/0845* (2013.01); *B28B 11/24* (2013.01);
(Continued)

(58) Field of Classification Search
CPC ..... C04B 11/28; C04B 11/30; C04B 40/0067; C04B 41/4505; C04B 2103/0045; C04B 2111/00017; C04B 2111/40; C04B 24/001; C04B 24/24; C04B 41/71; C04B 41/009; C04B 41/4576; C04B 41/4853;
(Continued)

(56) References Cited

U.S. PATENT DOCUMENTS 5,702,651 A * 12/1997 Bean .................. C04B 40/00
264/108
6,616,752 B1 * 9/2003 Basura .................. C04B 28/02
106/716
(Continued)

OTHER PUBLICATIONS

Park et al., "Hydration characteristics of calcium sulfoaluminate (CSA) cement/Portland cement blended pastes," Journal of Building Engineering 34 (2021) 101880. (Year: 2021).*
(Continued)

*Primary Examiner* — William P Fletcher, III
(74) *Attorney, Agent, or Firm* — DLA Piper LLP (US)

(57) ABSTRACT

A method of forming a lightweight polished concrete and the resulting composition. Calcium sulfoaluminate (CSA) cement and specialized grout may be added to an amount of water in a mixer. The CSA cement, specialized grout, and water may be blended to a smooth consistency. Lightweight aggregates (LWA) may be added to the blended CSA cement, specialized grout, and water to form a mixture. The mixture may be poured over a fiberglass rebar, vibrated, screeded, and allowed to set. The set mixture may be smoothed with float blades. The smoothed mixture may be hardened with metal blades, such that the hardened mixture becomes reflective. A concrete densifier may be applied to the hardened mixture to form the lightweight polished concrete. Optionally, one or more saw cuts may be formed in the lightweight polished concrete and a coating to may be applied to fill the one or more saw cuts.

16 Claims, 4 Drawing Sheets

(51) Int. Cl.
*B28B 11/24* (2006.01)
*B28B 23/00* (2006.01)
*C04B 7/32* (2006.01)
*C04B 18/20* (2006.01)
*C04B 22/02* (2006.01)
*C04B 28/06* (2006.01)
*C04B 41/48* (2006.01)
*C04B 103/44* (2006.01)
*C04B 111/40* (2006.01)
*C04B 111/00* (2006.01)
*C04B 111/70* (2006.01)

(52) U.S. Cl.
CPC .......... *B28B 23/0087* (2013.01); *C04B 7/323* (2013.01); *C04B 18/20* (2013.01); *C04B 22/02* (2013.01); *C04B 28/065* (2013.01); *C04B 41/4884* (2013.01); *C04B 2103/44* (2013.01); *C04B 2111/00939* (2013.01); *C04B 2111/40* (2013.01); *C04B 2111/70* (2013.01); *C04B 2201/20* (2013.01)

(58) Field of Classification Search
CPC . C04B 41/5081; C04B 41/522; C04B 41/533; C04B 41/63; C04B 41/65; C04B 41/72; C04B 18/027; C04B 7/323; C04B 18/20; C04B 22/02; C04B 41/4884; C04B 2103/44; C04B 2111/00939; C04B 2111/70; C04B 2201/20; C04B 28/065; B28B 11/0845; B28B 11/24; B28B 23/0087; B28B 1/08; B28B 11/04; B28B 23/0006
See application file for complete search history.

(56) References Cited

U.S. PATENT DOCUMENTS

| | | | |
|---|---|---|---|
| 7,695,560 B1* | 4/2010 | Buarque de Macedo | .................... C04B 20/065 106/716 |
| 8,110,040 B2 | 2/2012 | Bui | |
| 8,519,016 B2* | 8/2013 | Perez-Pena | ........... C04B 28/021 106/724 |
| 10,308,553 B2* | 6/2019 | Maslehuddin | ........... C04B 28/04 |
| 2002/0108338 A1* | 8/2002 | Barnett | ..................... E04C 2/06 52/649.1 |
| 2014/0087158 A1* | 3/2014 | Ciuperca | ................. B32B 3/266 428/223 |
| 2016/0185665 A1 | 6/2016 | Al-Aqueeli et al. | |
| 2020/0199014 A1 | 6/2020 | Filshill et al. | |
| 2020/0217086 A1* | 7/2020 | Hofele | ..................... B32B 5/022 |
| 2020/0261951 A1 | 8/2020 | Filshill et al. | |
| 2022/0402817 A1* | 12/2022 | Polak | ................... C04B 18/027 |

OTHER PUBLICATIONS

Official Action dated May 6, 2024, of related US Serial No. 17/683,913.

Almeshal, I. et al.: "Eco-friendly concrete containing recycled plastic as partial replacement for sand," Journal of Materials Research and Technology, vol. 9(3), 2020, pp. 4631-4643.

Official Action dated Mar. 13, 2024, of counterpart U.S. Appl. No. 17/683,801.

* cited by examiner

POLISHED LIGHTWEIGHT STRUCTURAL CONCRETE AND METHOD OF FORMATION

CROSS REFERENCE TO RELATED APPLICATIONS

This application claims the benefit of U.S. Provisional Application No. 63/158,591 entitled "LIGHTWEIGHT STRUCTURAL CONCRETE FROM RECYCLED MATERIALS" and filed on Mar. 9, 2021. The entire contents of this application are hereby incorporated by reference.

TECHNICAL FIELD

The present disclosure generally relates to concrete products, and more particularly to a polished structural insulative lightweight concrete composed of recycled materials.

BACKGROUND

Standard concrete mix is made of coarse aggregate (stone), fine aggregate (sand), and cement binder. Similarly to standard concrete mix, many current structural lightweight concrete mixtures have the same mix composition, except that the aggregates in the mix are replaced with lower-density ones. Lower-density replacement aggregates can be of man-made aggregates or natural aggregates, and have compression greater than structural strength of approximately 2,500 psi. Among the lightweight aggregate materials which have been employed in the prior art to produce lightweight concretes are expanded shale, pumice, volcanic tuffs, sintered diatomite, blast furnace slag, sintered fly ash, perlite, and vermiculite.

SUMMARY

A method of forming a lightweight polished concrete and the resulting composition. Calcium sulfoaluminate (CSA) cement may be added to an amount of water in a mixer, wherein a ratio of the water to the CSA cement is 1 quart to every 10 lbs of CSA cement. A grout including one or more types of Portland cement to the mixer. The CSA cement, the grout, and the water may be blended in the mixer for a period of time. Lightweight-foamed glass aggregates (FG-LWA) may be added to the mixer after a period of time to form a mixture, wherein the ratio of the CSA cement to LWA is 60/40 by weight. The mixture may be poured over a fiberglass rebar. The poured mixture may be vibrated and screeded. The vibrated and screeded mixture to set to form a set mixture. A top surface of the set mixture may be smoothed with a first type of blades to form a flattened surface. The flattened surface may be hardened with a second type of blades, such that the flattened surface becomes reflective. A concrete densifier may be applied to the reflective flattened surface.

BRIEF DESCRIPTION OF THE DRAWINGS

The drawings described below are for illustration purposes only. The drawings are not intended to limit the scope of the present disclosure.

DETAILED DESCRIPTION

Currently, the use of structural lightweight concrete has been limited to large cast structures where its lower density is required, such as bridges and high rises. Like most normal concrete materials, its utilization in residential buildings has been limited due to its inflexibility, material cost, and associated labor cost in handling the material. Thus, an economical lightweight concrete with structural strength and insulating and water resistant properties would be very valuable because it could overcome the limitations of traditional concrete and lightweight structural concrete now used in building applications. However, it is necessary to understand the common types of concrete matrix of both conventional and lightweight concrete, and their mechanics before better design and improvement can be obtained given its properties.

Herein, the term "structural aggregate" is defined as aggregate that has compression strength that is greater than 2500 psi as consistent with the term "structural" referred in American Society for Testing and Materials (ASTM) standard for concrete. The term "non-structural aggregate" is defined as aggregate with compression strength of 2500 psi or less.

Figure 1:
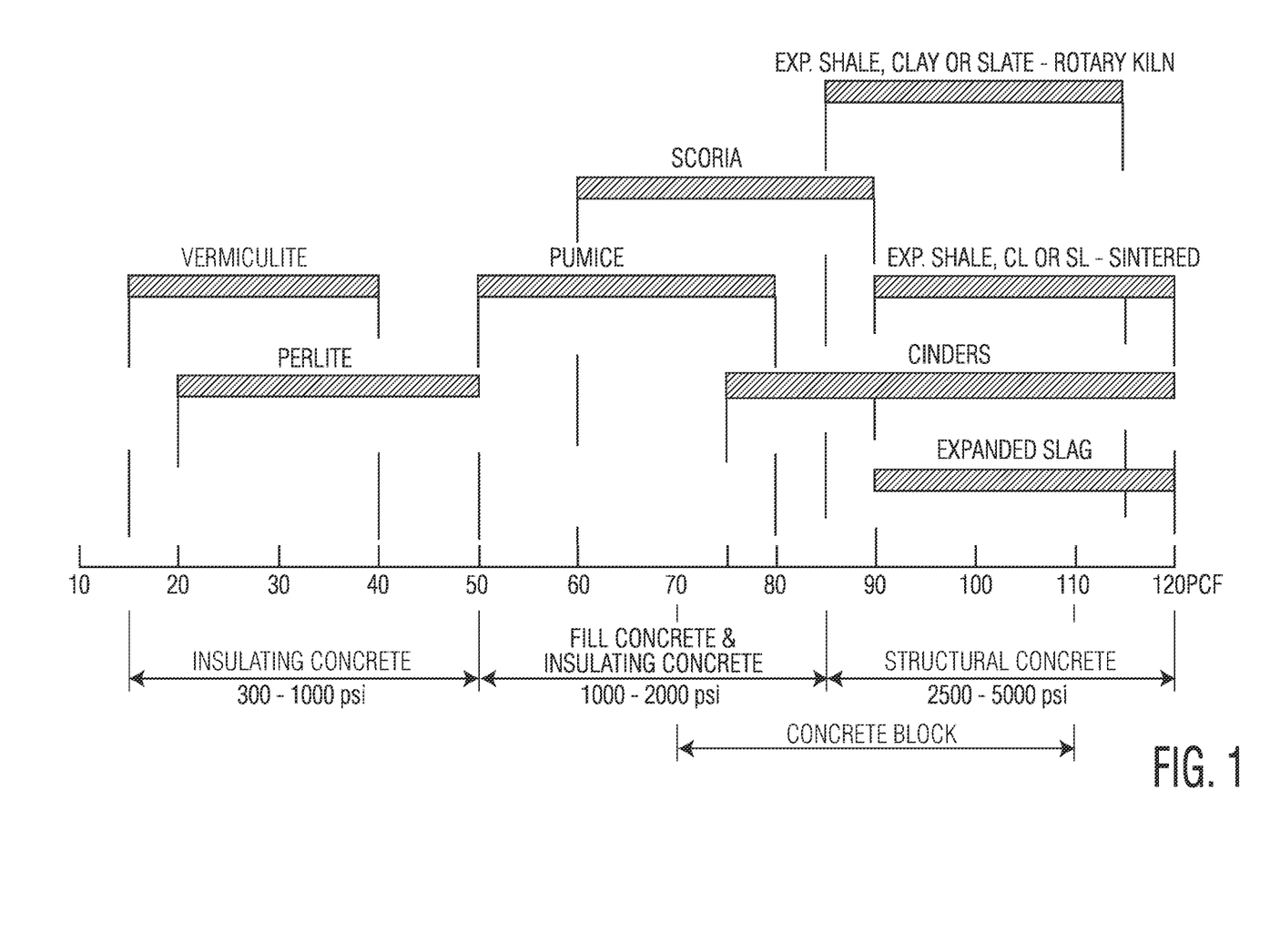
FIG. 1 is a diagram illustrating various available lightweight aggregate concrete mixes ranging from non-structural to structural strength, according to embodiments of the present invention.

Referring now to FIG. 1, a diagram illustrating various available lightweight aggregate concrete mixes ranging from non-structural to structural strength. The structural mixes may contain structural lightweight aggregate, such as expanded shale, expanded slag, cinders, or expanded clay. Most lightweight concrete (structural or otherwise) falls into three (3) categories. A first category of lightweight concrete relates to the standard structural concrete that utilizes lighter aggregates, such as expanded shale or expanded clay as normal stone replacement. The size of lightweight structural aggregates varies from coarse to fine. The mechanics of standard structural concrete matrix work the same way as regular concrete, since the structural aggregates are used to carry the load directly.

Figure 2:
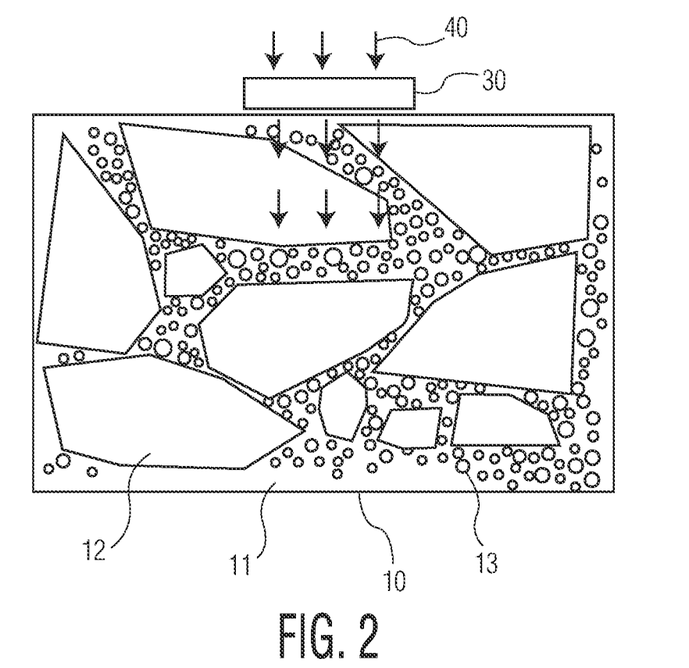
FIG. 2 is a diagram illustrating a matrix of the first category of lightweight concrete, according to embodiments of the present invention.

Referring now to FIG. 2, a diagram illustrating a matrix of the first category of lightweight concrete 10 and its mechanics is shown. The intention of this figure is to show how the concrete and structural aggregates works to carry load so as to better understand this aspect of concrete. As shown in FIG. 2, the first category of lightweight concrete 10 has coarse structural aggregates 12, fine sand aggregates 13, and a composition of cement binder and fly-ash 11. The mechanics of this matrix is straightforward. Force vectors 40 from a load starting from above a plate 30 travel a straight downward path through the structural aggregates 12 and through all materials in their path. This is because all the aggregates in this matrix have structural strength and are capable of holding up the load. The coarse aggregates 12 play an important role in providing the concrete strength.

A second category of lightweight concrete relates to a type of concrete that has no coarse aggregates with structural strength. This concrete is typically provided with fine structural fillers, such as masonry sand and air cells, expanded perlite, vermiculite, or wood particle as the larger non-structural fillers to take up space in the matrix. The concrete matrix in the second category (whether it is cellular or perlite concrete) relies solely on the solid cementitious structure (cement binder and fine structural aggregates such as sand) enveloping the air cells or the expanded perlite to carry the load. A third category of lightweight concrete relates to the type of concrete that has both structural and non-structural aggregates larger than masonry sand; the concrete matrix will have elements of both the first and second categories.

The second category of lightweight concrete is typically cellular concrete, perlite concrete, vermiculite concrete or the like. These types of lightweight concretes are often provided with non-structural strength and are limited in construction applications. Cellular and non-structural aggregate, such as expanded perlite concrete, has been limited only to a few applications that do not require structural strength, but rather take advantage of the insulating characteristics.

Past attempts to make this type of concrete into structural grade and make it more economical have resulted in failure. Such past failures are generally attributable to the lack of understanding of the concrete's matrix and its complex mechanism at the microstructure level. It is well known that a solid ordinary concrete made of fly ash, Portland cement and sand, can have compression strength of 8,000-9,000 psi. This strength is much more than the structural requirement of most applications. Therefore, it would make sense to lighten it by introducing effective voids in the concrete. However, creating void cells in the concrete matrix has not been so easy for the last few decades. Moreover, obtaining desirable properties in cellular concrete or non-structural aggregate concrete with the least amount of material and labor cost can also be a science, given that exotic materials with limited supply required for any concrete mixes or certain complex manufacturing processes will always make the concrete expensive. Therefore, in order to be cost effective, the concrete has to be made using common materials that are abundant in supply; and its manufacture process must also be simple.

Traditional approaches for large sized lightweight aggregate have included the use of materials such as perlite, expanded shale, and other naturally occurring porous rocks. Recently, research has examined sintered materials for use as a lightweight aggregate. Typically under either of these approaches, the material has an open structure, allowing it to absorb water. This can complicate the concrete forming process as the aggregate will often compete with the cement for available water. Thus, the aggregate is either soaked in water prior mixing, which can lead to excess water and less than optimal curing, or the aggregate is mixed with the cement immediately prior to use, thus necessitating the additional cost and inconvenience of mixing at or near a jobsite. Further, few small-sized lightweight aggregates have been developed. The industry still relies mainly on sand for small sized aggregates, which, while providing excellent flowability in the concrete mix prior to curing does not provide a particularly advantageous strength to weight ratio in the final product.

According to ASTM specification, a cellular concrete is a lightweight product consisting of Portland cement, cement-silica, cement-pozzolan, lime-pozzolan, lime-silica pastes or pastes containing blends of these gradients and having homogeneous void or cell structure, attained with gas-forming chemicals of foaming agents. Cellular lightweight concrete has existed since the 1930's and is produced throughout the world. It is known for its properties including thermal and sound insulation, as well as being lightweight. Traditionally, cellular lightweight concrete is made with calcium containing materials and siliceous materials. Calcium containing materials may include Portland cement, granulated blast furnace slag, and lime; siliceous materials include fly ash and ground silica.

In cellular lightweight concrete, the density can be controlled by the introduction of gas or foam. The use of cellular concrete overcomes the supply problem associated with the use of lightweight aggregates, and further allows an increased degree of control of the density of the finished product. Thus, cellular concrete can be useful in floor fill and roof deck applications, providing insulation and a high degree of fire protection. However, it is generally unsuitable as a structural material because of shrinkage and cracking.

Figure 3:
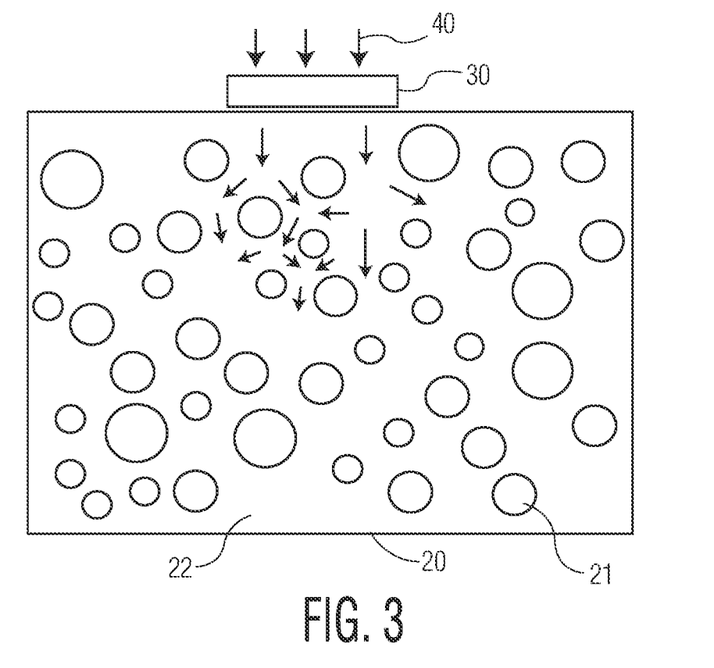
FIG. 3 is a diagram illustrating a matrix of a conventional cellular or non-structural filler concrete, according to embodiments of the present invention.

Referring now to FIG. 3, a diagram illustrating a matrix of a conventional cellular or non-structural filler concrete 20 and its mechanics is shown. This type of concrete matrix works differently from the standard concrete 10. As shown in FIG. 3, the cellular or non-structural filler concrete 20 is provided with non-structural fillers or voids 21 and a solid or cementitious structure 22. However, the mechanics of this matrix is more complex. Force vectors 40 from a load are distributed and dispersed in different directions within the cementitious structure 22 and travel around the non-structural fillers or voids 21. The vectors 40 interact with one another to hold up the load. In this matrix, the cementitious structural composition 22 does all the work and is often made of a cement binder, such as Portland cement, pozzolan such as fly-ash, and fine structural filler such as sand. The design of this solid structure 22 enveloping the non-structural fillers or voids is very important in providing compression strength of an economic concrete of this type.

In practical terms, aerated cellular concrete is difficult to cast on a building site as its quality depends very much on external conditions. Environmental factors mean that the attainment of a desired formation of pores, which effect heat-insulating properties, lightness, load-bearing strength, and even overall volume, is not guaranteed.

Recycled glass has been employed for some time as a concrete aggregate. For this purpose, recycled glass is crushed so as to form glass-making sand. However, this poses its own challenges, including the risks of an alkali-silicate reaction. Recycled lass is an endangered aggregate and can react with the alkalis dissolved in the pore water of the concrete. This reaction results in voluminous reaction products which can lead to internal stresses and cracks and to the destruction of the concrete texture. In addition, recycled glass may contain materials that are very different from glass, such as lids (e.g., aluminum and lead) and labels, as they are crushed with the glass and can lead to additional problems. In addition, the bond between the cement matrix and the smooth surface of the glass grains is rather weak and that the use of glass can make later recycling of the concrete difficult. For these reasons, the use of glass as a sand substitute in constructional concrete is typically advised against.

However, the use of recycled glass in glass manufacturing reduces energy consumption, raw materials use, and tear on machinery. However, not all used glass can be recycled into new product because of impurity, cost, or mixed colors. It is reported that the quantity of mixed waste glass has outstripped the quantity of color sorted glass. There is a need to develop applications for mixed waste glass. Use of recycled materials in construction applications is one of the most attractive options because of the large quantity, low quality requirements, and widespread sites of construction.

Therefore it may be desirable to create a flowable, setting compound with, in comparison with the state of the art, relevantly better and predeterminable properties with respect to weight per unit volume, compressive strength and/or thermal conductance. In particular, a constructional concrete with granulated lightweight aggregates is to be proposed that is suitable for building construction and civil engineering and capable of being cast on the building site in a formwork as cast-in-place concrete. Waste products or recycled primary material are envisioned for use as the lightweight aggregates.

In an example, a lightweight concrete mixture may be formed by incorporating lightweight aggregates (LWA) into a mixture of white/grey calcium sulfoaluminate (CSA) cement, a specialized grout, and water. The mixture may be poured over a rebar (e.g., fiberglass) support structure, allowed to cure, and then strengthened with a densifier. The LWA may be any type of light-weight aggregate material, preferably made from recycled plastic and/or glass. In an example, the LWA may include recycled plastics. The recycled plastics may come from any source. For, example, polyethylene terephthalate (PET) bottles may be used. The waste PET bottles may have a thickness of approximately 1 mm to approximately 1.5 mm. The bottles may be washed to remove impurities and may be ground down (e.g., using a blade mill) to produce a lightweight aggregate ranging in particle size from approximately 5 mm to approximately 80 mm, although different sizes are contemplated.

In other example, the LWA may include lightweight-foamed glass aggregates (FG-LWA). The FG-LWA may be an inert, stable, and environmentally friendly-substrate. To form FG-LWA, recycled glass may be cleaned, ground, mixed with a foaming agent, heated, and allowed to fragment from temperature shock. The resulting aggregate may be cellular, with a relatively low bulk density, but relatively high durability. FG-LWA may have many uses, for example, as a lightweight fill for construction applications, vehicle arrestor beds, building insulation, etc. However, since FG-LWA provides an important economic driver for glass recycling, finding new uses and applications for FG-LWA may be extremely desirable. FG-LWA may be chemically inert. Moreover, FG-LWA may be extremely stable, as it does not degrade, and may be temperature stable to 800° C. The incorporation of FG-LWA into concrete may provide significant heat insulation.

Suitable FG-LWA may be procured from AERO AGGREGATES, LLC, Eddystone, Pa. The FG-LWA may be prepared from a recycled glass cullet. The FG-LWA may be prepared from a sodo-calic glass. As FG-LWA is made up of silica, it may be considered a natural material for regulatory purposes. As FG-LWA is made from recycled glass, it may be considered environmentally friendly. FG-LWA properties include low unit weight, low thermal conductivity, high strength, non-absorbent, non-toxic, non-leachable, chemically stable, impervious to UV degradation, freeze/thaw stable, and fireproof. The FG-LWA may be prepared from recycled glass cullet that contains less than 1% borosilicate glass.

In an example, the FG-LWA may have a particle size of about 5 mm to about 80 mm. In another example, the FG-LWA may have a particle size of about 10 mm to about 60 mm. The FG-LWA may have a bulk density of about 120 kg/m$^3$ to about 400 kg/m$^3$. In another example, the FG-LWA may have a bulk density of about 200 kg/m$^3$ to about 240 kg/m$^3$.

The FG-LWA may be formed using recycled glass cullet. In one example, the recycled glass cullet may be cleaned, ground to less than approximately 150 micrometers (US Standard sieve size No. 100), mixed with a foaming agent (e.g., a carbonate foaming agent) in a pug mill, heated, and allowed to fragment from temperature shock. The rate of cooling may be related to the final particle size (e.g., rapid cooling leads to a relatively finer particle size distribution). The resulting FG-LWA may be cellular/vesicular. After sample preparation, the initial moisture content may be measured following ASTM D2216 (2010), grain size distributions may be determined following ASTM C136/136M (2006), and the initial bulk density may be measured following ASTM C127 (2012a) on the FG-LWA. The average moisture content may be approximately 1.06% and the average bulk density may be approximately 227.2 kg/m3 (14.2 pcf). Sieve analyses may be performed following the dry sieving method on the FG-LWA. Particle size may range from approximately 10 to 30 mm (0.39 to 1.18 in) and the FG-LWA may be a very uniformly graded material.

In another example, the recycled glass cullet may be cleaned, ground, mixed with a foaming agent, heated, and allowed to fragment from temperature shock. The resulting FG-LWA may be cellular/vesicular (foaming creates a thin wall of glass around each gas bubble). By volume, FG-LWA may be approximately 92% gas bubbles and 8% glass. The water content (per ASTM D 2216) of FG-LWA may change with time due to the cellular nature of the material as the exterior ruptured pores are filled with water. The water content may vary from approximately 2% (when contacting water) to approximately 38% after being completely submerged for several days.

The FG-LWA may replace standard lightweight aggregates (e.g., shale and pumice) as the FG-LWA may be approximately 85% lighter than other standards materials. For example, the FG-LWA may be ⅓ the weight of shale and ½ the weight of pumice. The use of FG-LWA in a settable casting compound may not only lower the weight per unit volume, but by virtue of the surface structure of the FG-LWA, which exhibits a multitude of pores that have been broken open, the bond between the CSA cement and the FG-LWA may be very strong. For example, the bond may be greater than between gravel aggregate and cement. This excellent bond enables a high compressive strength and a better tensile bending strength in comparison with normal heavy concrete.

In addition, because of the closed-pore structure of the FG-LWA, the aggregate particles may remain dry in their interior and the pores may remain filled with gas. The FG-LWA may be embedded in a wet mortar without the pore content being diminished as a result. Since FG-LWA is inert, any reaction upon contact of the lightweight aggregate with other substances (e.g. acids and oils) is not a concern and the alkalinity of the concrete may not be affected. Because of the closed cells, the insulating properties of the FG-LWA may remain unchanged, even in a wet environment.

Unlike conventional lightweight concretes, even those that use foam glass, the present formulation may mix the LWA with white/grey CSA cement instead of Portland cement. Portland cement requires kiln temperatures of around 1500° C., whereas CSA cement require only around 1250° C. The CSA clinker is softer than OPC clinker, requiring less energy at the mill to grind it and significantly lower energy to run through the kiln. A major advantage of using CSA cement is the ability to produce zero shrinkage or very low shrinkage materials. When in contact with water, CSA cement immediately begins to produce ettringite, a mineral that fills the pores of the cement matrix. This makes CSA cement a denser material than Portland cement, contributes to the mix gaining high early strength, and creates a small amount of expansion. This expansion can be controlled and is very stable in the long term.

Another factor that contributes to the strength and very low shrinkage of CSA cement is water demand. Typically ordinary Portland cement requires about 18% water to properly hydrate. The rest of added water is for workability and to allow for handling and installation. CSA cement requires about 35% water to properly hydrate. This high water demand means that there is little extra water needed to make a workable mix, and very little water left in the material after the initial set. This may result in very few voids and, hence, very low shrinkage.

In addition, the CSA cement may result in a more visually appealing product than Portland cement. Cured CSA cement may be very white in color and may be conducive for polishing. In an example, the ratio of CSA cement to LWA may be 60/40 by weight.

The specialized grout may include a blend of one or more types of Portland cement and a blend of one or more polymers and expanding agents specially formulated to be used for the grouting of anchor bolts, rebar (e.g., fiberglass and/or conventional steel), pipe, and wooden posts. It may have a fluid consistency and may set rapidly. The specialized grout may be of high strength, have high freeze/thaw resistance, non-shrinking, non-corrosive, and may form strong bonds. In an example, the specialized grout may be free of gypsum and chlorides.

The specialized grout may include one or more ingredients having different purposes. For example, to improve strength and setting time, the specialized grout may include one or more of: one or more types of Portland cement (e.g., Type I, II, and III) and CSA cement. To improve workability and/or flow, the specialized grout may include one or more of: polycarboxylate, polymerized naphthalene sulfate, melamine, and fly ash (e.g., Class C (Pozzolan)). To improve shrinkage control, the specialized grout may include one or more of: a thermoplastic natural resin, barium sulfate, and sulfur oxide. To optimize set time, the specialized grout may include a pH lowering compound (e.g., citric acid). The specialized grout may also include a filler, such as 16×50 silica sand. In an example, the specialized grout may be a fluid and may be added to the mixture in a ratio of 192 fl. oz. per 80 pound bag of CSA cement.

Referring now to Table 1, a chart comparing the characteristics of conventional cement and the lightweight concrete with the specialized grout is shown.

TABLE 1

Characteristics of Lightweight Concrete with Specialized Grout

| | 1 Hour | 1 Day | 7 Days | 28 Days |
|---|---|---|---|---|
| Compressive Strength (ASTM C 109 Modified) | 2,500 psi (17.1 MPa) | 4,000 psi (27.4 MPa) | 6,000 psi (41.1 MPa) | 7,200 psi (49.3 MPa) |
| Tensile Strength (ASTM C 307) | | | 350 psi (2.4 MPa) | |
| 192 fl. oz per 80 lb bag | 1,500 psi (10.3 MPa) | 6,800 psi (46.9 MPa) | | |
| Set Time | Initial set is approximately 15 minutes at 70° F. | | | |

TABLE 1-continued

Characteristics of Lightweight Concrete with Specialized Grout

| | 1 Hour | 1 Day | 7 Days | 28 Days |
|---|---|---|---|---|
| (ASTM C 191) Expansion | | | | |
| (ASTM C 157) | | | | 0.35% |
| (ASTM C 827) | | | | 0.12% |
| Length Change | | | | +0.0025% |
| Yield | | | 55 lb bag = 0.42 ft$^3$ Extended with 20 lb of gravel = 0.52 ft$^3$ | |
| Chloride Permeability | | | | <1000 Coulombs |

The lightweight concrete may be formed using a conventional mixing process using any type of conventional mixer. The CSA cement may be added to a proper ratio of water in the mixer and gradually mixed in, blending to a smooth consistency. In an example, the volume of water may be approximately 1 quart to every 10 lbs of CSA cement. The ingredients may be mixed for approximately 3 minutes. Once the CSA cement is at the desired consistency, the LWA may be added and blended until the LWA is fully coated and the mixture is at the desired consistency for pouring.

Figure 4:
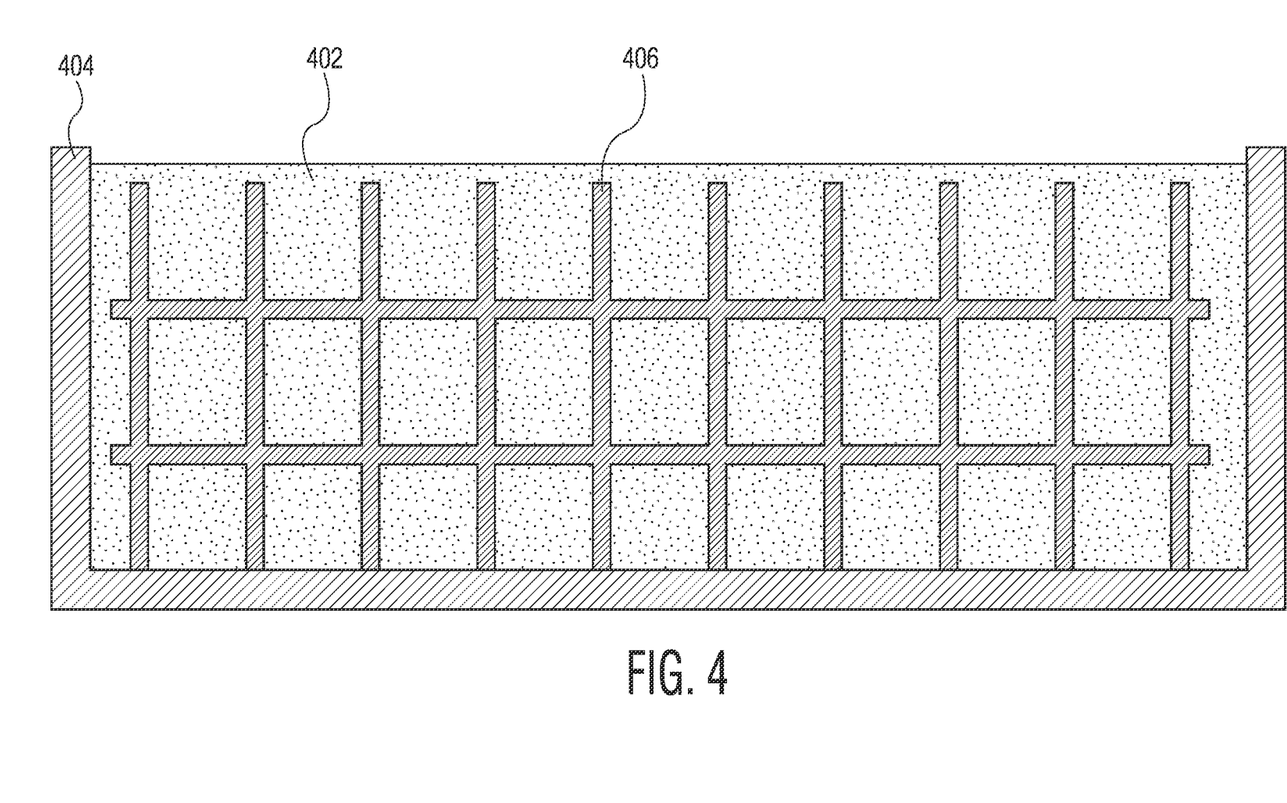
FIG. 4 is a cross-sectional diagram illustrating pouring a cement mixture over a fiberglass rebar, according to embodiments of the present invention.

Referring now to FIG. 4, a cross-sectional diagram illustrating pouring the mixture 402 over rebar 406 is shown. Once the mixture 402 is at a desired consistency, the mixture 402 may be poured over a rebar 406 of a desirable shape. FIG. 4 shows the rebar 406 in a mold 404, but it should be noted that the mold 404 is not required in all applications. In an example. the rebar 406 may be conventional rebar made from metal. In another example, the rebar 406 may be made from a lightweight polymer (e.g., fiberglass) and may provide structural support. This lightweight rebar 406 may be twice as strong as steel while being 5 times lighter, and may be recyclable.

The rebar 406 may be made of individual rods that may range from approximately ¼" to 1" in diameter. The rebar 406 may be formed to fit different shapes of all structural applications with the spacing between the individual rods of the rebar 406 dictated by the application. The rebar 406 may be a single layer of individual rods, or it may be a three-dimensional (3D) structure like a cage. In an example, the individual rods of the rebar 406 cage may be spaced approximately 1" apart.

The rebar 406 may hold the LWA in place during pouring/setting, while the CSA cement flows around it, thereby ensuring a uniform distribution of the LWA in the mold. Once the mixture is poured, it may be allowed to cure for an appropriate time based on the size and shape of the mold. For example, the mixture 402 may be allowed to set for approximately 15 minutes at approximately 70° F. In another example, the mixture may be poured over a conventional steel rebar. It should be noted that, unlike conventional lightweight concretes, no foaming agent is required.

After the mixture sets and fully cures, a concrete densifier may be applied to form the lightweight concrete. The concrete densifier may be a lithium based concrete densifier, such as the Formula One™ Lithium Densifier MP sold by SCOFILED®. The concrete densifier may be a penetrating semi-transparent to transparent liquid that reacts with concrete to improve abrasion resistance, gloss retention, surface compressive strength, and dusting. The concrete densifier may react with the mixture to form lithium silicate. The concrete densifier may be applied such that it saturates the cured mixture 402 and penetrates into the cured mixture 402.

After it is applied, the concrete densifier may be moved around, for example by a broom, and agitated for approximately 30 minutes. After the period of agitation, the concrete densifier may be allowed to dry and set for approximately 6 hours.

In conventional techniques, a densifier may be applied to concrete in a volume such that it penetrates approximately $\frac{1}{16}^{th}$ of an inch. In an example, the densifier may penetrate the cured mixture 402 to a depth greater than approximately 3 inches. In some examples, the concrete densifier may penetrate through an entire thickness of the cured mixture 402. This may result in a more robust and aesthetically pleasing final product.

Optionally, the mixture 402 may be processed using one or more steps before the concrete densifier is applied. For example, after it is poured, the mixture 402 may be vibrated using, for example a vibration float, to reduce/eliminate air bubbles. Additionally or alternatively, a straightedge may be used to "strikeoff" or "screed" the mixture 402. This process removes excess mixture 402 and brings the top surface of the mixture 402 to proper grade. In addition, after the mixture 402 sets, float blades may be used to smooth its surface and make it flat.

After the concrete densifier has dried and the lightweight concrete is formed, the lightweight concrete may be optionally polished with one or more ceramic discs. In an example, the lightweight concrete may be polished with a 400 grit ceramic disc. Additionally or alternatively, one or more saw cuts may optionally be made into the lightweight concrete using American Concrete Institute (ACI) standards. Additionally or alternatively, a coating (e.g., polyurea) may be applied to the lightweight concrete. The coating may fill the one or more saw cuts.

In another example, the mixture 402 may be used to form a polished concrete floor. Unlike conventional concrete floors, the mixture 402 may be polished immediately after it is poured and set. Typically, the process of polishing concrete is similar to sanding wood. Heavy-duty polishing machines, for example one or more concrete grinders, are used to gradually grind down surfaces to the desired degree of shine and smoothness. Conventional concrete is usually poured to full depth to take advantage of the concrete's full structural strength, and also help to prevent cracks. Typically, conventional concrete must be professionally finished with power trowels, vibrating floats, screeds, float blades, etc. after it sets and then allowed to properly cure with water for seven (7) days on average. Polishing cannot begin until the concrete is fully cured, which is generally twenty-eight (28) days.

Polished concrete floors are typically made by a mechanical process of grinding and polishing with the help of a penetrant chemical to provide different texture. The polishing of concrete is a multi-step process which requires specialized tools and equipment. The chemical penetrant employed for polishing is called as hardener. There are several ways to bring this surface effect of polished finished look.

Whatever be the method chosen, the basic approach is the same. First a grinding process is employed to smooth out the concrete. Machines that are equipped with diamond segmented abrasives of different grits may be employed. These machines help to grind down the concrete surfaces until the desired shine and smoothness is achieved. As the grinding process proceeds, coarser grit abrasives move to finer grit abrasives. Most of the concrete grinding process starts from a value less than 100 grit.

Next the concrete may be polished using a wet method and/or a dry method. In the wet method of polishing concrete, during the grinding process, water is used to cool the diamond abrasives. This hence reduces the amount of dust created during the polishing process. The water used in wet polishing method helps to reduce the friction. This water also acts as a lubricant, thus increasing the life of the polishing abrasives. However, as water is used throughout the process, a huge amount of slurry is formed. This creates difficulty in cleaning and disposal.

In the dry polishing process, no water is used. A containment system may assembled and/or attached to a polishing machine that any dust is directly taken through this arrangement through vacuum effect. This may clear the mess during the polishing process, which is an advantage over the wet polishing method. The dry method is used commonly in industrial floor polishing as it is more convenient, fast and environmentally friendly.

Overall, a conventional process to obtain polished concrete may include a number of time and labor intensive steps. The first step may be to prepare the concrete surface by grinding. If the concrete surface has any existing coatings, they may be removed using a tool specifically or removing coatings that uses a diamond abrasive of 16 to 20 grit. If cracks or joints are present on the concrete surface, it must be sealed by means of fillers (semi-grid) or epoxies.

Once sealed, the surface is ground with the diamond abrasives. The grit used can range from 30 to 40. A metal bonded diamond abrasive may be used first, followed by a metal bonded diamond grinding using an 80 grit abrasive. Next, a 150 grit metal bonded diamond abrasive may be used. After the series of grinding, the surface may be densified by applying a chemical hardener. Polishing may then be performed by means of a resin bond diamond abrasive with a grit varying from 100 to 200. A combination of both grits may also be used. Polishing may continue using a 400 grit abrasive followed by an 800 grit resin bond diamond abrasive. A final finishing may be performed using a 1500 or a 3000 grit resin-bond diamond abrasive.

Figure 5:
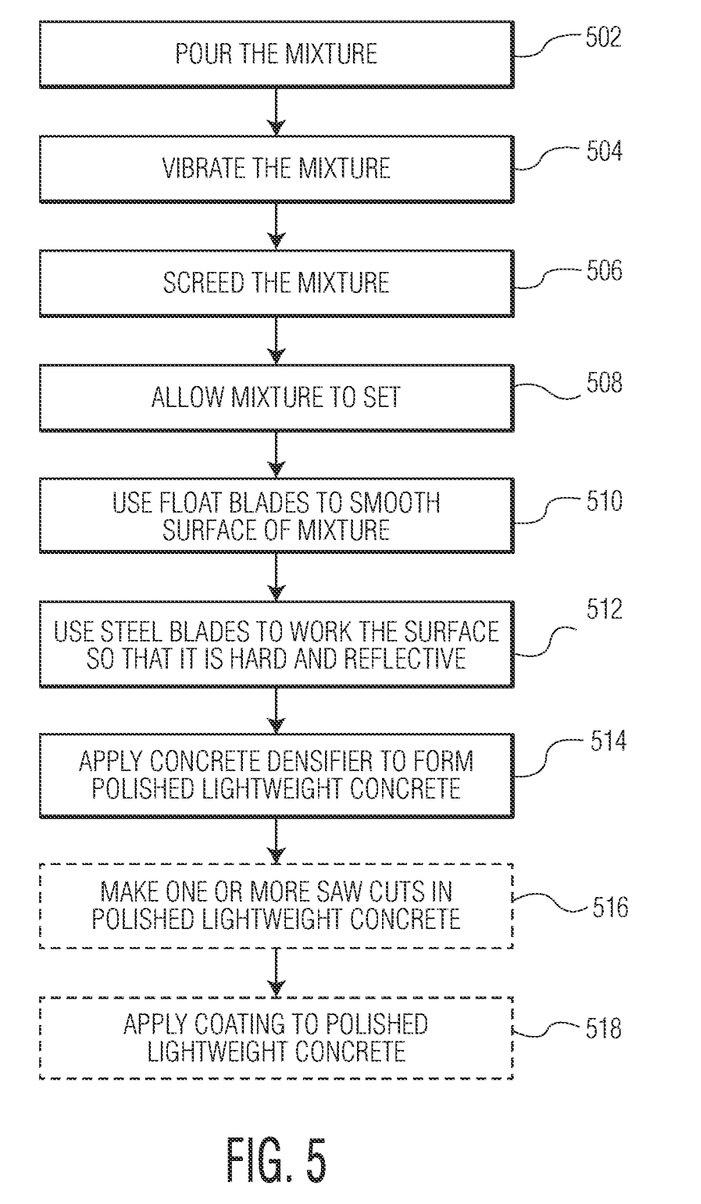
FIG. 5 is a flowchart illustrating an improved and more efficient process of forming a polished floor using the mixture, according to embodiments of the present invention.

Referring now to FIG. 5, a flowchart illustrating an improved and more efficient process of forming a polished floor using the mixture 402 is shown. In step 502, the mixture 402 may be poured as described above. In step 504, the mixture 402 may be vibrated using, for example a vibration float, to reduce/eliminate air bubbles. In step 506, a straightedge may be used to "strikeoff" or "screed" the mixture 402. This process removes excess mixture 402 and brings the top surface of the mixture 402 to proper grade. In step 508, the mixture 402 may be allowed to set for an appropriate time based on the size and shape of the mold. For example, the mixture 402 may be allowed to set for approximately 15 minutes at approximately 70° F.

In step 510, float blades may be used to smooth the surface of the mixture 402 after it sets in order to make it flat. In step 512, steel blades may be used to work the surface of the set mixture 402. In an example, a power trowel and or float may be used. Multiple passes using linear, clockwise, and counterclockwise patterns may be used. This process may harden the surface of the set mixture 402 and make it reflective.

In step 514, a concrete densifier may be applied. The concrete densifier may be a lithium based concrete densifier, such as the Formula One™ Lithium Densifier MP sold by SCOFILED®. The concrete densifier may be a penetrating semi-transparent to transparent liquid that reacts with concrete to improve abrasion resistance, gloss retention, surface compressive strength, and dusting. The concrete densifier may react with the mixture to form lithium silicate. The concrete densifier may be applied such that it saturates the cured mixture and penetrates into the lightweight concrete. After it is applied, the concrete densifier may be moved around, for example by a broom, and agitated for approximately 30 minutes. After the period of agitation, the concrete densifier may be allowed to dry and set for approximately 6 hours.

In conventional techniques, a densifier may be applied to concrete in a volume such that it penetrates approximately $1/16^{th}$ of an inch. In an example, the densifier may penetrate the lightweight concreate to a depth greater than approximately 3 inches. In some examples, the concrete densifier may penetrate through an entire thickness of the lightweight concrete. This may result in a more robust and aesthetically pleasing final product.

In optional step 516, after the concrete densifier has dried and the polished lightweight concrete is formed, one or more saw cuts may be made using ACI standards. In optional step 518, a coating (e.g., polyurea) may be applied to the lightweight polished concrete. The coating may fill the one or more saw cuts.

The different examples of lightweight concrete described herein may be 50% lighter than conventional concrete and may have a compressive strength greater than 5,000 psi. It may have an R factor of 10 and may be fireproof, mold-resistant, and non-water intrusive. Because of these properties, it may be used for structural and/or architectural purposes in both interior and exterior settings.

Although features and elements are described above in particular combinations, one of ordinary skill in the art will appreciate that each feature or element can be used alone or in any combination with the other features and elements.

The invention claimed is:

1. A method of forming a lightweight polished concrete comprising:
    adding calcium sulfoaluminate (CSA) cement to an amount of water in a mixer, wherein a ratio of the water to the CSA cement is 1 quart to every 10 lbs of CSA cement;
    adding a grout comprising one or more types of Portland cement to the mixer;
    blending the CSA cement, the grout, and the water in the mixer for a period of time;
    adding lightweight-foamed glass aggregates (FG-LWA) to the mixer after a period of time to form a mixture, wherein the ratio of the CSA cement to FG-LWA is 60/40 by weight;
    pouring the mixture over a fiberglass rebar;
    vibrating and screeding the poured mixture;
    allowing the vibrated and screeded mixture to set to form a set mixture;
    smoothing a top surface of the set mixture with a first type of blades to form a flattened surface;
    hardening the flattened surface with a second type of blades, such that the flattened surface becomes reflective; and
    applying a concrete densifier to the reflective flattened surface.

2. The method of claim 1, further comprising:
    forming one or more saw cuts in the reflective flattened surface; and
    filling the one or more saw cuts with a coating.

3. The method of claim 2, wherein the coating comprises polyurea.

4. The method of claim 1, wherein the period of time is approximately 3 minutes.

5. The method of claim 1, wherein the fiberglass rebar comprises one or more individual rods having a diameter of approximately 1/4" to 1".

6. The method of claim 1, wherein the fiberglass rebar comprises a three-dimensional (3D) cage.

7. The method of claim 6, wherein the individual rods of the 3D cage are spaced approximately 1" apart.

8. The method of claim 1, wherein the fiberglass rebar is contained in a mold.

9. The method of claim 1, wherein the concrete densifier extends through the entire thickness of the set mixture.

10. The method of claim 1, wherein the concrete densifier comprises lithium.

11. The method of claim 1, wherein the grout further comprises one or more of polycarboxylate, polymerized naphthalene sulfate, melamine, and fly ash.

12. The method of claim 1, wherein the grout further comprises a pH reducing agent.

13. The method of claim 1, wherein the grout further comprises one or more of a thermoplastic natural resin, barium sulfate, and sulfur oxide.

14. The method of claim 1, wherein the grout further comprises silica sand.

15. The method of claim 1, wherein the first type of blades are float blades.

16. The method of claim 1, wherein the second type of blades are steel blades.

* * * * *